(12) United States Patent
Giri et al.

(10) Patent No.: US 12,174,703 B2
(45) Date of Patent: Dec. 24, 2024

(54) SYSTEM AND METHOD FOR MANAGING RECOVERY OF MANAGEMENT CONTROLLERS

(71) Applicant: Dell Products L.P., Round Rock, TX (US)

(72) Inventors: Prashanth Giri, Round Rock, TX (US); Murali K. Somarouthu, Leander, TX (US); Babu Krishna Chandrasekhar, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 5 days.

(21) Appl. No.: 18/185,580

(22) Filed: Mar. 17, 2023

(65) Prior Publication Data
US 2024/0311249 A1   Sep. 19, 2024

(51) Int. Cl.
*G06F 11/00*   (2006.01)
*G06F 11/14*   (2006.01)

(52) U.S. Cl.
CPC .... *G06F 11/1435* (2013.01); *G06F 2201/865* (2013.01)

(58) Field of Classification Search
CPC .......... G06F 11/1435; G06F 2201/865; G06F 11/1407
USPC ...................................... 714/1-57
See application file for complete search history.

(56) References Cited

U.S. PATENT DOCUMENTS

| | | | | |
|---|---|---|---|---|
| 7,631,216 B2* | 12/2009 | Kimura | ............... | G06F 11/1456 714/5.11 |
| 7,712,131 B1* | 5/2010 | Lethe | ................... | G06F 21/57 726/20 |
| 11,340,998 B1* | 5/2022 | Marshall | ............ | G06F 11/1448 |
| 2002/0188837 A1* | 12/2002 | Dayan | ................... | G06F 9/4406 714/E11.133 |
| 2004/0153724 A1* | 8/2004 | Nicholson | ........... | G06F 11/0709 714/E11.133 |
| 2007/0011736 A1* | 1/2007 | Kalibjian | ............... | G06F 21/52 726/14 |
| 2008/0168192 A1* | 7/2008 | Park | ................... | G06F 11/0757 710/27 |
| 2010/0005150 A1* | 1/2010 | Kubota | .............. | H04L 12/2814 709/212 |
| 2011/0066779 A1* | 3/2011 | Bogenberger | ...... | G06F 11/1487 710/107 |
| 2011/0161725 A1* | 6/2011 | Allen | ................... | G06F 11/1443 711/170 |
| 2011/0271136 A1* | 11/2011 | Abbot | ................. | G06F 11/3608 714/2 |

(Continued)

*Primary Examiner* — Sarai E Butler
(74) *Attorney, Agent, or Firm* — Womble Bond Dickinson (US) LLP (57) ABSTRACT

Methods and systems for managing operation of data processing systems are disclosed. To manage operation of the data processing systems, the data processing systems may host management controllers that manage the operation of the data processing systems. The management controllers may be programmable, and may initiate recoveries for the management controllers when operation management software becomes corrupted or is unavailable for other reasons. During the recoveries, new copies of the operation management software may be obtained and used to initiate desired operation of the management controllers.

20 Claims, 6 Drawing Sheets

(56) References Cited

U.S. PATENT DOCUMENTS

2017/0372058 A1\* 12/2017 Kulkarni ................ G06F 21/78
2022/0285953 A1\* 9/2022 Jung .................... G06F 15/177

\* cited by examiner

SYSTEM AND METHOD FOR MANAGING RECOVERY OF MANAGEMENT CONTROLLERS

FIELD

Embodiments disclosed herein relate generally to device management. More particularly, embodiments disclosed herein relate to systems and methods to manage recovery of management controllers.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing operation of data processing systems. To manage the operation of data processing systems, a management system may obtain information regarding their operation and update their operation based on the obtained information.

The data processing systems may host a management controller that may cooperate with the management system to manage the operation of the data processing systems. The management controller may be a programmable device.

If the management controller is unable to access operation management software (e.g., firmware), then the management controller may be unable to cooperatively manage the operation of a host data processing system. To recover from such scenarios, the management controller may obtain a new copy of the operation management software and use it to operate.

To obtain the copy of the operation management software, the management controller may partition storage accessible by both the management controller and data processing system. Once partitioned, downloading (e.g., from a trusted entity) and storing of the copy of the operation management software in the storage partition may be obtained. The copy of the operation management software may be validated, and used to initiate operation of the management controller.

The aforementioned process may be performed entirely remotely with respect to the data processing system and the management controller. Consequently, an administrator or other person tasked with managing the data processing system may be able to manage more data processing systems when compared to performing in person recoveries for the data processing systems.

In an embodiment, a method for managing management controllers hosted by a data processing system is disclosed. The method may include identifying, by a management controller of the management controllers, that access to operation management software is unavailable; based on the unavailability of the operation management software: establishing, by the management controller, a storage partition in storage resources; presenting, by the management controller, the storage partition to a management entity of the data processing system; initiating, by the management controller, storage of the operation management software in the storage partition; storing, by the management controller, a copy of the operation management software in a partition of storage resources of the management controller; booting, by the management controller, a second management entity using the copy of the operation management software, and managing, by the management controller and using the second management entity, operation of the data processing system.

Identify that the access to the operation management software is unavailable may include making an identification that a primary copy of the operation management software and a backup copy of the operation management software are corrupted.

Establishing the storage partition may include identifying presence of a universal serial bus storage device; and allocating the storage partition in the universal serial bus storage device.

The universal serial bus storage device may be hosted by the data processing system, and the universal serial bus storage device may be accessible by the management controller.

Initiating storage of the operation management software in the storage partition may include providing an identifier of the universal serial bus storage device to the management entity and an identifier of the storage partition to the management entity.

Initiating storage of the operation management software in the storage partition may also include sending a notification to an administrator of the data processing system, the notification indicating that the copy of the operation management software is to be obtained from a trusted entity and stored using the identifier of the universal serial bus storage device and the identifier of the storage partition.

The management entity may include an operating system hosted by computing resources of the data processing system, and the management controller comprises an embedded data processing system that operates independently of the data processing system.

Initiating storage of the operation management software in the storage partition may include providing a static internet protocol address to the management entity, the static internet protocol address being for a universal serial bus network interface controller usable by the management controller.

In an embodiment, a non-transitory media is provided. The non-transitory media may include instructions that when executed by a processor cause the computer-implemented method to be performed.

In an embodiment, a data processing system is provided. The data processing system (or a management controller hosted by the data processing system) may include the non-transitory media and a processor, and may perform the computer-implemented method when the computer instructions are executed by the processor.

Figure 1:
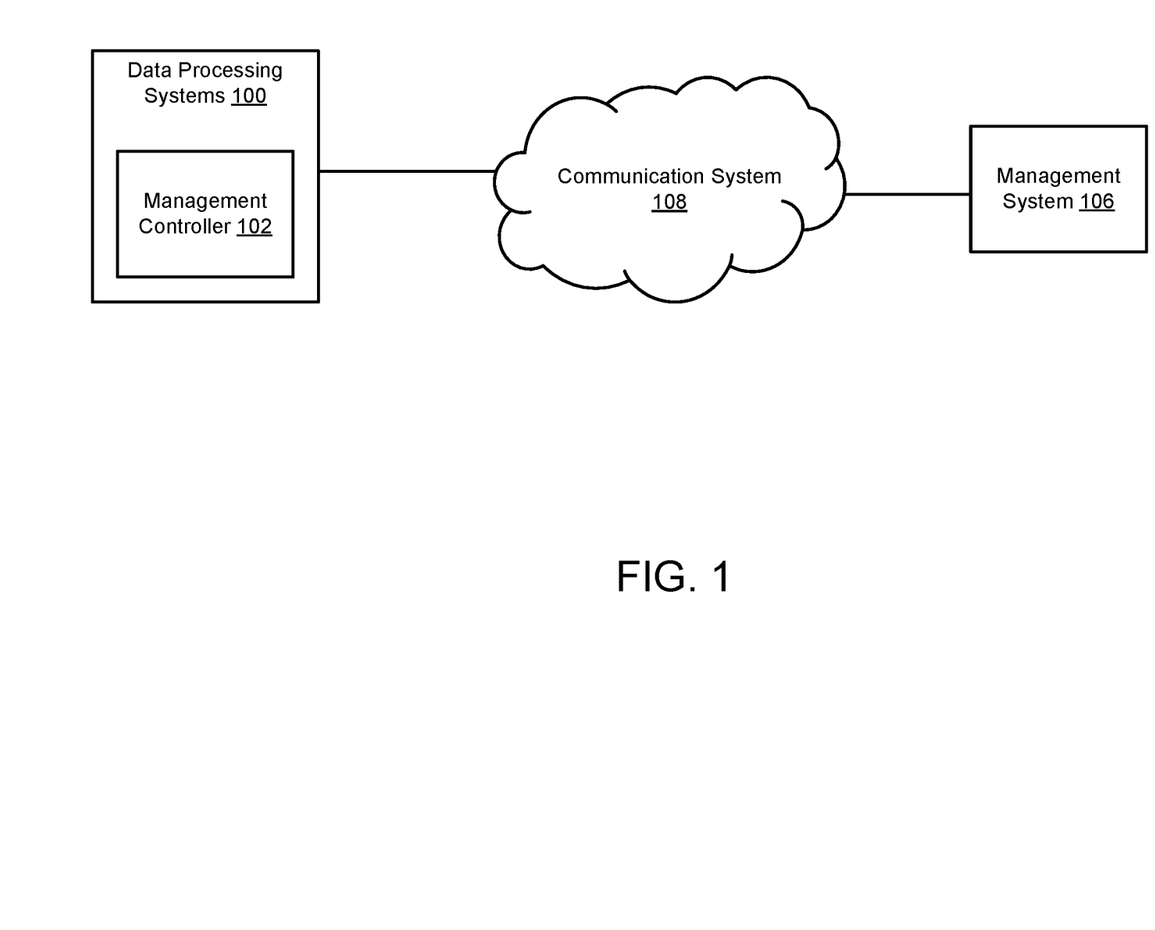
FIG. 1 shows a block diagram illustrating a system in accordance with an embodiment.

Turning to FIG. 1, a block diagram illustrating a system in accordance with an embodiment is shown. The system shown in FIG. 1 may provide computer-implemented services. The computer implemented services may include any type and quantity of computer implemented services. For example, the computer implemented services may include data storage services, instant messaging services, database services, and/or any other type of service that may be implemented with a computing device.

To provide the computer-implemented services, the system may include any number of data processing systems 100. Data processing systems 100 may provide the computer implemented services to users of data processing systems 100 and/or to other devices (not shown), and/or may cooperate with other devices that provide the computer implemented services. Different data processing systems may provide similar and/or different computer implemented services.

For example, any of data processing systems 100 may be members of cloud environments that provide the computer implemented services. The cloud environments may include any number of devices that provide computer implemented services.

To provide the computer-implemented services, data processing systems 100 may include various hardware components (e.g., processors, memory modules, storage devices, etc.) and host various software components (e.g., operating systems, application, startup managers such as basic input-output systems, etc.). These hardware and software components may provide the computer-implemented services via their operation.

To provide certain computer-implemented services, the hardware and/or software components may need to operate in predetermined manners. If the hardware and/or software components do not operate in the predetermined manners, then a data processing system may be unable to provide all, or a portion, of the computer-implemented services that it normally provides.

To manage the operations of the data processing systems, any of data processing systems 100 may host a copy of management controller 102. Management controller 102 may manage the operation of the host data processing system. To do so, management controller 102 may perform various management actions such as, for example, modifying operation of the software and/or hardware components of the host data processing system, performing security operations such as software validation, and/or other types of management operations.

Management controller 102 may be implemented using one or more programmable devices. For example, management controller 102 may be implemented using a data processing system (e.g., embedded) that operates independently from the host device, and that may be operably connected to the host data processing system and/or other entities via in-band and/or out-of-band communication channels.

Depending on the characteristics of the host data processing system, management controller 102 may be programmed to perform different types of management operations. For example, management controller 102 may host management software that manage its operation, and the manner in which it manages operation of the data processing system.

However, if management controller 102 lacks access to the management software, it may be unable to manage the operation of the host data processing system. To mitigate the likelihood of the management software being unavailable, management controller 102 may store multiple, redundant copies of the management software (e.g., firmware, drivers, operating system images, etc.). Even so, if all of the copies of the management software become unavailable (e.g., due to corruption and/or for other reasons), then management controller 102 may be unable to manage operation of the host data processing system.

If management controller 102 is unable to manage the operation of the host data processing system, then the host data processing system may be less likely to be able to provide desired computer implemented services.

In general, embodiments disclosed herein may provide methods, systems, and/or devices for managing the operation of data processing systems 100 to improve the likelihood of the host data processing system being able to provide desired computer implemented services. To manage the operation of data processing system 100, management system 106 may (i) collect information regarding the operation of a data processing system, and/or components thereof, and (ii) modify the operation of the data processing system, and/or components hereof. By doing so, management system 106 may manage the operation of any number of data processing systems 100. Accordingly, the data processing systems may be more likely to successfully provide desired computer implemented services over time.

To provide its functionality, management system 106 may (i) cooperate with management controllers hosted by data processing systems 100 and/or (ii) provide access to management software used by the management controllers (e.g., to facilitate recovery of the management controllers following loss of access to the management software).

Management controller 102 may (i) similarly cooperate with management system 106 to facilitate management of data processing systems 100 by management system 106, and (ii) perform recoveries of management software. To cooperate with management system 106, management controller 102 may rely on access to the management software. If access to the management software is lost (e.g., depriving management controller 102 of the ability to operate in a manner for cooperation with management system 106), then management controller 102 may perform a recovery for the management software.

Figure 2A:
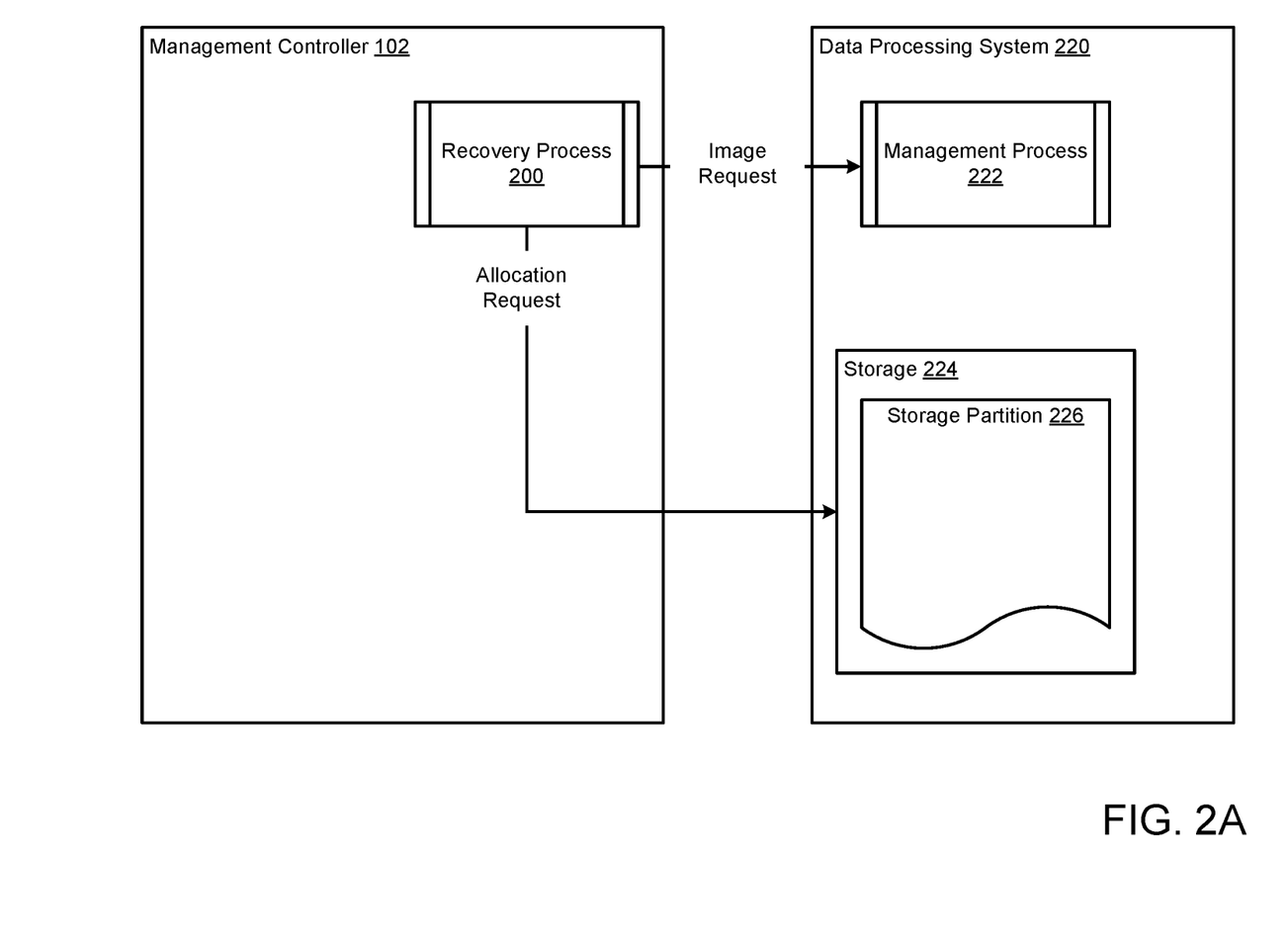
FIGS. 2A-2C show diagrams illustrating data flows in accordance with an embodiment.
Figure 2B:
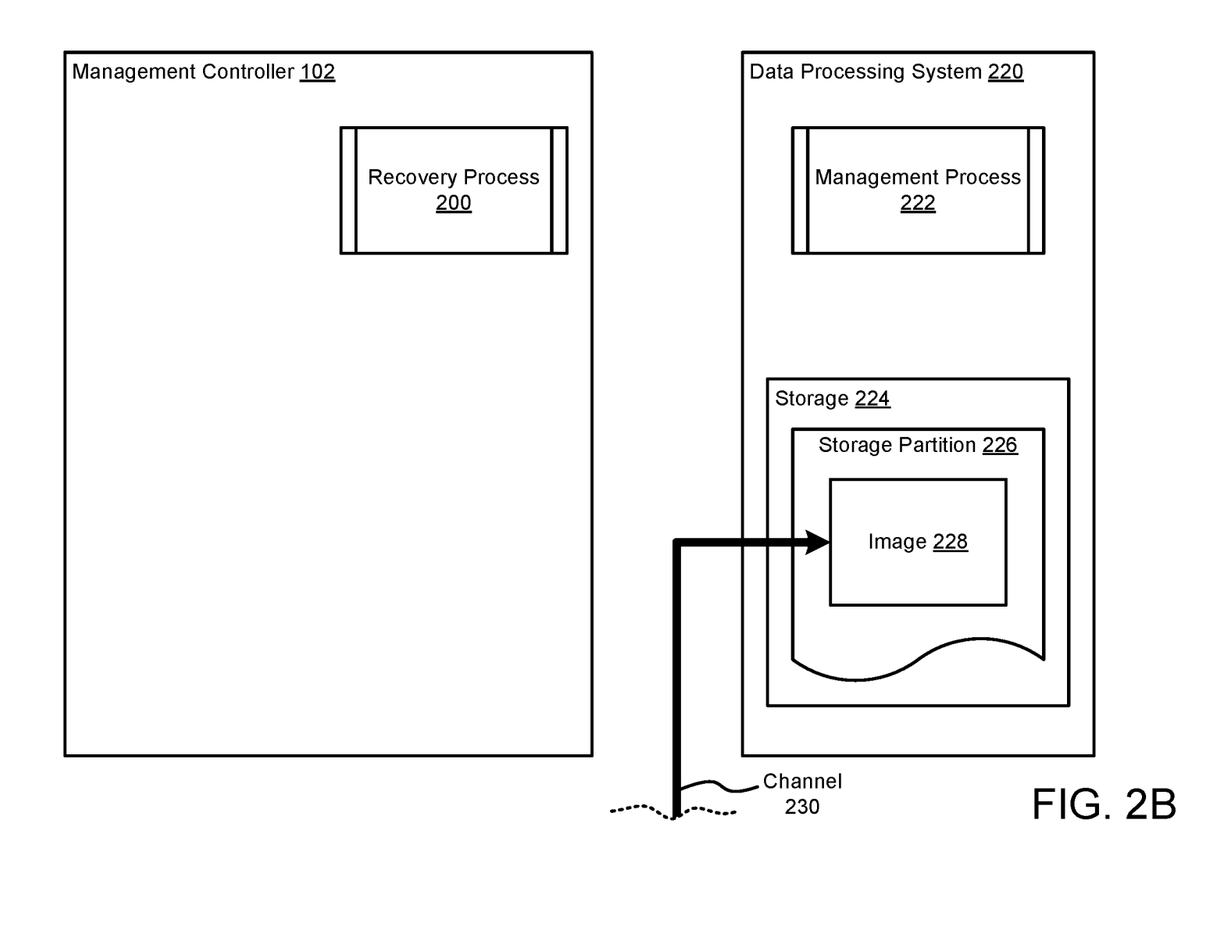
Figure 2C:
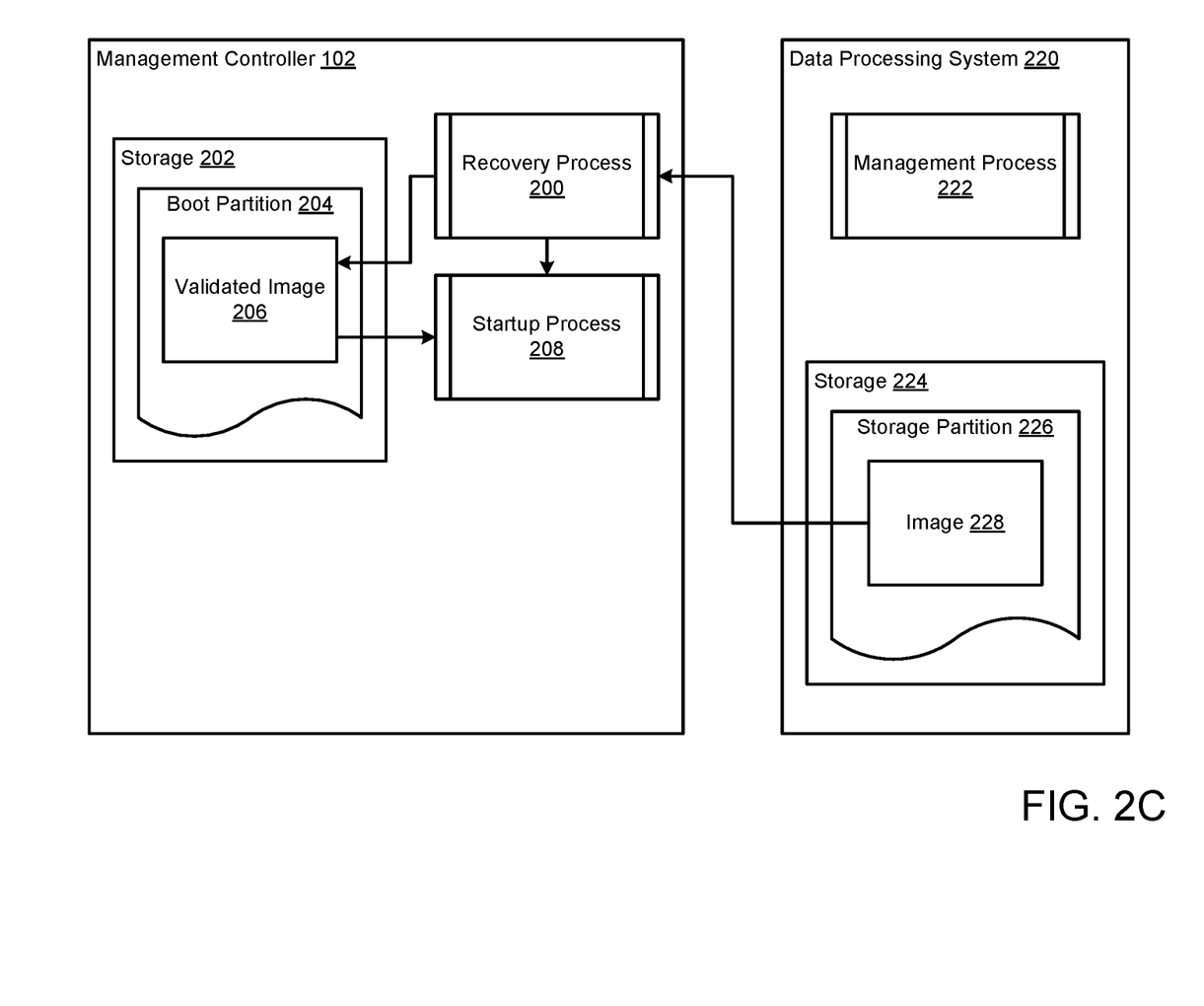

To perform a recovery of the management software, management controller 102 may (i) identify loss of access to the management software, (ii) based on the loss of access, partition storage resources of a universal serial bus device (accessible by both the host data processing system and management controller 102), (iii) present the partitioned resources to a host data processing system, (iv) initiate storage of a copy of the management software in the partitioned resources, and (v) use the copy of the management software to recover access to the management software. Refer to FIGS. 2A-2C for additional details regarding performance of recoveries for management software used by management controller 102.

Once the management software is recovered, then management controller 102 may perform a boot or other startup operation to enter an operating state conducive to cooperation with management system 106. While in the state, management controller 102 may (i) provide information regarding the operation of the host data processing system to management system 106, (ii) receive information from management system 106, (iii) initiate performance of various actions by the host data processing system to facilitate management of the host data processing system, and/or perform other types of management actions.

Figure 3:
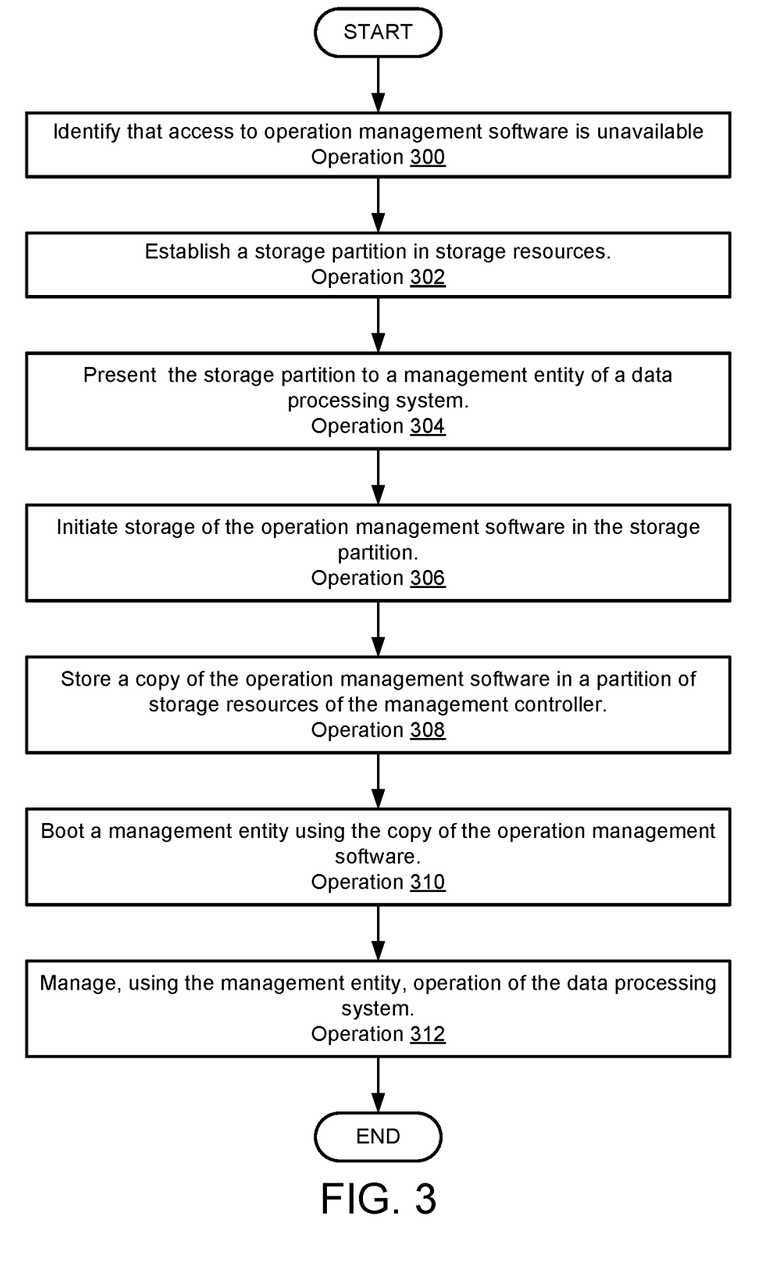
FIG. 3 shows a flow diagram illustrating a method of managing operation of a data processing system in accordance with an embodiment.

When providing their functionality, any of data processing system 100 and management system 106 may perform all, or a portion, of the method illustrated in FIG. 3.

Any of data processing systems 100 and/or management system 106 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Management system 106 may be implemented with multiple computing devices. The computing devices of management system 106 may cooperatively perform processes for managing the operation of data processing systems 100. The computing devices of management system 106 may perform similar and/or different functions.

Management controller 102 may be implemented using, for example, a system on a chip or another type of embedded data processing system.

Any of the components illustrated in FIG. 1 may be operably connected to each other (and/or components not illustrated) with communication system 108. In an embodiment, communication system 108 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein.

To further clarify embodiments disclosed herein, diagrams illustrating data flows implemented by and data structures used by a system over time in accordance with an embodiment are shown in FIGS. 2A-2C.

Turning to FIG. 2A, a first data flow diagram illustrating data flows, data processing, and/or other operations that may be performed by the system of FIG. 1 in accordance with an embodiment is shown.

Consider a scenario in which a data processing system hosts management controller 102. If software used to manage the operation of management controller 102 becomes corrupted or is unusable for other reasons, management controller 102 may perform recovery process 200 for the software. During recovery process 200, management controller 102 may initiate retrieval of and use of another copy of the software. To do so, management controller 102 may utilize resources of the host data processing system 220.

For example, during recovery process 200, management controller 102 may instantiate storage partition 226 in storage 224. Storage 224 may be implemented, for example, using a universal serial bus storage device and/or other types of storage devices. Storage parturition 206 may be instantiated by sending an allocation request to storage 224. The storage (or an entity managing storage 224) may instantiate storage partition 226 based on the allocation request. Storage partition 226 may be a logical delineation of a portion of storage resources of storage 224. Storage partition 226 may be identifiable using (i) an identifier of storage 224, and (ii) an identifier of the storage partition (e.g., may be identified using a logical unit number, a partition identifier, or another type of identifier).

To interact with storage 224, management controller 102 may utilize a driver, firmware, and/or other type of management entity. The management entity may receive and process allocation requests, data access requests, and/or other types of request with respect to storage 224.

Once instantiated, an image request for an image of the software may be send to management process 222 of data processing system 220. Management process 222 may be implemented by, for example, an operating system, drivers, and/or other management entities of data processing system 220.

Management process 222 may, through access to network interface cards and/or other communications devices of data processing system 220, initiate retrieval and storage of a copy of the software in storage partition 226. For example, management process 222 may (i) download a copy of the software from a remote entity, (ii) may request that another entity download and store the copy of the software in storage partition 226, etc. If a request is made, the request may be presented, for example, to an administrator or another person tasked with management data processing system 220. The request may include information usable for the person to identify where the copy of the software may be located (e.g., may be hosted by a data processing system of a trusted entity such as a manufacturer or distributor of data processing system 220). The person may then download the copy of the software and store it in storage partition 226.

As part of this process, the person may interact with data processing system 220 entirely remotely and/or in person. If interacted with in person, the person may remove storage 224, attach storage 224 to other devices, use the other devices to download and store the copy of the software in storage partition 226, and then return storage 224 to data processing system 220. Refer to FIGS. 2B-2C for additional details regarding obtaining the copy of the software.

While described with respect to a universal serial bus storage device, storage 224 may be implemented using other types of devices. For example, storage 224 may be implemented using a universal serial bus network interface card and storage resources of management controller 102 (and/or storage resources of other devices such as a shared storage). If implemented using a universal serial bus network interface card, management controller 102 may provide, as part of image request, network access information (e.g., an internet protocol address) for an end point presented by the universal serial bus network interface card. The access information may allow the copy of the software to be stored in storage 224 using the network access information rather than using identifiers for storage device 224, and/or storage partition 226.

Management controller 102 may then, once the copy of the software is stored in the shared location, retrieve the copy of the software.

Turning to FIG. 2B, a second data flow diagram illustrating data flows, data processing, and/or other operations that may be performed by the system of FIG. 1 in accordance with an embodiment is shown.

Continuing with the discussion of the scenario, image 228 may be stored in storage partition 226. Image 228 may be a software image, or other data structure, that includes a copy of the software used by management controller 102 to operate. For example, image 228 may include a boot image, firmware, etc.

Image 228 may be obtained via channel 230 (e.g., an operable connection to another device). Another device (e.g., operated by a person prompted by management process 222 to obtain the software) may store image 228 in storage partition 226.

Turning to FIG. 2C, a second data flow diagram illustrating data flows, data processing, and/or other operations that may be performed by the system of FIG. 1 in accordance with an embodiment is shown.

Continuing with the discussion of the scenario, once image 228 is stored, recovery process 200 may (i) perform a validation and (ii) if valid store validated image 206 in storage 202 (e.g., storage of management controller 102. For example, validated image 206 may be stored in boot partition 204. While not illustrated, multiple copies of validated image 206 may be stored in multiple places to provide redundancy for the software so that corruption or loss of access to one copy of the software may not deprive management controller 102 of access to all copies of the software.

Once obtained, recovery process 200 may utilize validated image 206 to perform startup process 208. During startup process 208, validated image 206 may be used to place management controller 102 in a predetermined operating state conducive with cooperation with a management system (e.g., 106). For example, validated image 206 may include firmware or other software usable to operate management controller 102 in a predetermined manner such that operation of data processing system 220 may be managed by management controller 102 in cooperation with a management system.

Once startup process 208 is complete, management controller 102 may, for example, communicate with the management system, monitor operation of components of data processing system 220, issue command to and/or otherwise modify operation of data processing system 220, and/or perform other type of actions in cooperation with a management system to manage operation of data processing system 220.

While illustrated in FIGS. 2A-2C as being separate from data processing system 220, it will be appreciated that management controller 102 may be hosted by data processing system 220. Data processing system 220 may be similar to any of data processing systems 100.

In an embodiment, any of management controller 102 and/or data processing system 220 are implemented using a hardware device including circuitry. The hardware device may be, for example, a digital signal processor, a field programmable gate array, or an application specific integrated circuit. The circuitry may be adapted to cause the hardware device to perform the functionality of management controller 102 and/or data processing system 220 as discussed herein. Management controller 102 and/or data processing system 220 may be implemented using other types of hardware devices without departing embodiment disclosed herein.

In an embodiment, any of management controller 102 and/or data processing system 220 are implemented using a processor adapted to execute computing code stored on a persistent storage that when executed by the processor performs the functionality of management controller 102 and/or data processing system 220 discussed throughout this application. The processor may be a hardware processor including circuitry such as, for example, a central processing unit, a processing core, or a microcontroller. The processor may be other types of hardware devices for processing information without departing embodiment disclosed herein.

In an embodiment, any of management controller 102 and/or data processing system 220 include storage which may be implemented using physical devices that provide data storage services (e.g., storing data and providing copies of previously stored data). The devices that provide data storage services may include hardware devices and/or logical devices. For example, storage may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage may include a memory device (e.g., a dual in line memory device) in which data is stored and from which copies of previously stored data are provided. In another example, storage may include a persistent storage device (e.g., a solid-state disk drive) in which data is stored and from which copies of previously stored data is provided. In a still further example, storage may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

The storage may store any of the data structures discussed herein. Any of these data structures may be implemented using, for example, lists, tables databases, linked lists, unstructured data, and/or other types of data structures.

As discussed above, the components of FIG. 1 may perform various methods to manage operation of data processing systems. FIG. 3 illustrates a method that may be performed by the components of the system of FIG. 1. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method of managing a data processing system in accordance with an embodiment is shown. The method may be performed by any of data processing systems 100, management controller 102, management system 106, and/or other components of the system shown in FIG. 1.

Prior to operation 300, any number of redundant copies of operation management software used by a management controller may become inaccessible to the management controller. The operation management software may become inaccessible due to, for example, corruption of the copies of the management software.

At operation 300, access to operation management software may identified as unavailable. The identification may be made by attempting to read or otherwise access the operation management software. During the attempt to accessing the operation management software, a validation process or other integrity check may indicate that the operation management software is corrupted or otherwise unavailable (e.g., a signature and/or other information may indicate that the content of the operation management software has been corrupted or otherwise modified such that the copies of the operation management software may not be trusted).

At operation 302, a storage partition in storage resources may be established. The storage partition may be established by (i) identifying the storage resources, and (ii) sending an allocation request to a management entity for the storage resources. The storage resources may be identified by, for example, enumerating universal serial bus devices accessible by a management controller. The allocation request may be sent to the management entity via a communication. The management entity may be, for example, firmware hosted by the universal serial bus device.

The storage partition may be established by (i) identifying presence of a universal serial bus network interface controller, and (ii) allocating storage resources of the management controller or a shared storage reachable via the universal serial bus network interface controller.

At operation 304, the storage partition is presented to a management entity of a data processing system. The data processing system may host a management controller.

The storage partition may be presented by providing identification information for the partition. The identification information may include (i) an identifier of the universal serial bus and an identifier for the partition, or (ii) providing network access information for the universal serial bus network interface controller. Either form of provided information may allow the data processing system and/or other devices to store data in the storage partition.

At operation 306, storage of a copy of operation management software in the storage partition is initiated. The storage may be initiated by (i) prompting the data processing system to download a copy of the operation management software from a trusted entity or (ii) prompting a person (e.g., using another data processing system) to download a copy of the operation management software from the trusted entity. In either approach, the copy may then be stored in the storage partition (e.g., using either the identifiers for the device/partition, or the network access information).

At operation 308, a copy of the operation management software is stored in a partition of storage resources of the management controller. The copy of the operation management software may be stored by (i) validating the copy of the operation management software (e.g., by reading it from the storage partition), and (ii) storing the validated copy of the operation management software in the storage of the management controller (or another storage accessible by the management controller). If the copy of the operation management software is not validated, then a new copy may be obtained from the same or a different trusted entity (e.g., by performing any of the aforementioned operations again).

At operation 310, a management entity (e.g., for the management controller) is booted using the copy of the operation management software. The management entity may be booted by initiating execution of the management entity, performing configurations of the management controller, and/or by performing other actions to establish operation of the management entity. The management entity may be, for example, an executing instance of firmware for the management controller. The executing instance may be obtained by copying instructions from storage (e.g., a boot partition of the management controller) to memory, and initiating execution of the instructions by the management controller.

At operation 312, operation of the data processing is managed using the management entity. The operation may be managed by, for example, the management entity communicating with a management system, the management entity issuing operations to be performed by the data processing system, etc.

The method may end following operation 312.

Using the method illustrated in FIG. 3, embodiments disclosed herein may provide a data processing system that may be more likely to continue to operate in a desired manner even after a management controller is unable to enter a desired operating state.

Figure 4:
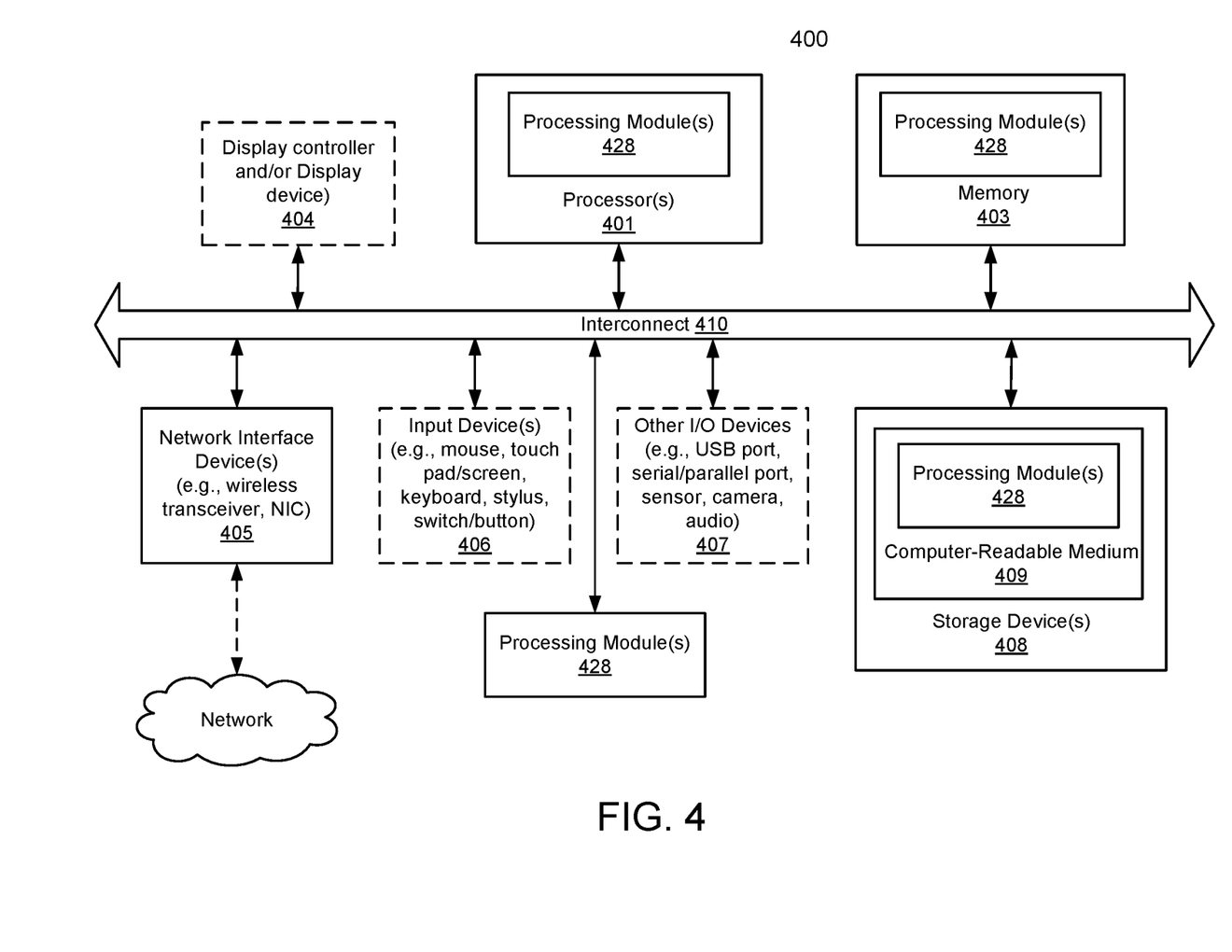
FIG. 4 shows a block diagram illustrating a data processing system in accordance with an embodiment.

Any of the components illustrated in FIGS. 1-2C may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions.

The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing management controllers hosted by a data processing system, the method comprising:
   identifying, by a management controller of the management controllers, that access to operation management software is unavailable; and
   by the management controller in response to the management controller identifying that the access to the operation management software is unavailable:
      establishing a storage partition in first storage resources;
      presenting the storage partition to a management entity of the data processing system;
      initiating obtaining of the operation management software from a remote source and storage of the operation management software retrieved from the remote source in the storage partition, the remote source being remote to both the data processing system and the management controller;
   storing a copy of the operation management software stored in the storage partition of the first storage resources in a partition of second storage resources of the management controller;
   booting a second management entity using the copy of the operation management software; and
   managing, using the second management entity, operation of the data processing system.

2. The method of claim 1, wherein identifying that the access to the operation management software is unavailable comprises:
   making an identification that a primary copy of the operation management software and a backup copy of the operation management software are corrupted.

3. The method of claim 2, wherein establishing the storage partition comprises:
   identifying presence of a universal serial bus storage device; and
   allocating the storage partition in the universal serial bus storage device.

4. The method of claim 3, wherein the universal serial bus storage device is hosted by the data processing system, and the universal serial bus storage device is accessible by the management controller.

5. The method of claim 3, wherein initiating the obtaining of the operation management software from the remote source and the storage of the operation management software retrieved from the remote source in the storage partition comprises:

providing an identifier of the universal serial bus storage device to the management entity and an identifier of the storage partition to the management entity.

6. The method of claim 5, wherein initiating the obtaining of the operation management software from the remote source and the storage of the operation management software retrieved from the remote source in the storage partition further comprises:
sending a notification to an administrator of the data processing system, the notification indicating that the copy of the operation management software is to be obtained from a trusted entity and stored using the identifier of the universal serial bus storage device and the identifier of the storage partition, the trusted entity being the remote source.

7. The method of claim 6, wherein the management entity comprises an operating system hosted by computing resources of the data processing system, and the management controller comprises an embedded data processing system that operates independently of the data processing system.

8. The method of claim 2, wherein initiating the obtaining of the operation management software from the remote source and the storage of the operation management software retrieved from the remote source in the storage partition comprises:
providing a static internet protocol address to the management entity, the static internet protocol address being for a universal serial bus network interface controller usable by the management controller to obtain the operation management software from the remote source.

9. The method of claim 8, wherein the universal serial bus network interface controller belongs to the management controller and not to the data processing system.

10. The method of claim 1, wherein the management controller is connected to computing resources of the data processing system in which the management controller is hosted using out-of-band communication channels.

11. A non-transitory machine-readable medium having instructions stored therein, which when executed by a processor, cause the processor to perform operations for managing management controllers hosted by a data processing system, the operations comprising:
identifying, by a management controller of the management controllers, that access to operation management software is unavailable;
by the management controller in response to the management controller identifying that the access to the operation management software is unavailable:
establishing a storage partition in first storage resources;
presenting the storage partition to a management entity of the data processing system;
initiating obtaining of the operation management software from a remote source and storage of the operation management software retrieved from the remote source in the storage partition, the remote source being remote to both the data processing system and the management controller;
storing a copy of the operation management software stored in the storage partition of the first storage resources in a partition of second storage resources of the management controller;
booting a second management entity using the copy of the operation management software; and
managing, using the second management entity, operation of the data processing system.

12. The non-transitory machine-readable medium of claim 11, wherein identifying that the access to the operation management software is unavailable comprises:
making an identification that a primary copy of the operation management software and a backup copy of the operation management software are corrupted.

13. The non-transitory machine-readable medium of claim 12, wherein establishing the storage partition comprises:
identifying presence of a universal serial bus storage device; and
allocating the storage partition in the universal serial bus storage device.

14. The non-transitory machine-readable medium of claim 13, wherein the universal serial bus storage device is hosted by the data processing system, and the universal serial bus storage device is accessible by the management controller.

15. The non-transitory machine-readable medium of claim 13, wherein initiating the obtaining of the operation management software from the remote source and the storage of the operation management software retrieved from the remote source in the storage partition comprises:
providing an identifier of the universal serial bus storage device to the management entity and an identifier of the storage partition to the management entity.

16. The non-transitory machine-readable medium of claim 15, wherein initiating the obtaining of the operation management software from the remote source and the storage of the operation management software retrieved from the remote source in the storage partition further comprises:
sending a notification to an administrator of the data processing system, the notification indicating that the copy of the operation management software is to be obtained from a trusted entity and stored using the identifier of the universal serial bus storage device and the identifier of the storage partition, the trusted entity being the remote source.

17. The non-transitory machine-readable medium of claim 16, wherein the management entity comprises an operating system hosted by computing resources of the data processing system, and the management controller comprises an embedded data processing system that operates independently of the data processing system.

18. A data processing system, comprising:
computing resources; and
a management controller comprising:
a processor; and
a memory coupled to the processor to store instructions, which when executed by the processor, cause the processor to perform operations for managing the management controller of the data processing system, the operations comprising, by the management controller:
identifying that access to operation management software is unavailable;
by the management controller in response to the management controller identifying that the access to the operation management software is unavailable:
establishing a storage partition in storage resources;
presenting the storage partition to a management entity of the data processing system;
initiating obtaining of the operation management software from a remote source and storage of the operation management software retrieved from the remote source in the storage partition, the remote source being remote to both the data processing system and the management controller;

storing a copy of the operation management software in a partition of storage resources of the management controller;

booting a second management entity using the copy of the operation management software; and managing, using the second management entity, operation of the data processing system.

19. The data processing system of claim 18, wherein identifying that the access to the operation management software is unavailable comprises:

making an identification that a primary copy of the operation management software and a backup copy of the operation management software are corrupted.

20. The data processing system of claim 19, wherein establishing the storage partition comprises:

identifying presence of a universal serial bus storage device; and allocating the storage partition in the universal serial bus storage device.

\* \* \* \* \*